Sept. 25, 1923. 1,468,762
A. TAYLOR ET AL
TELESCOPE, MICROSCOPE, AND THE LIKE
Filed July 20, 1920 2 Sheets-Sheet 1
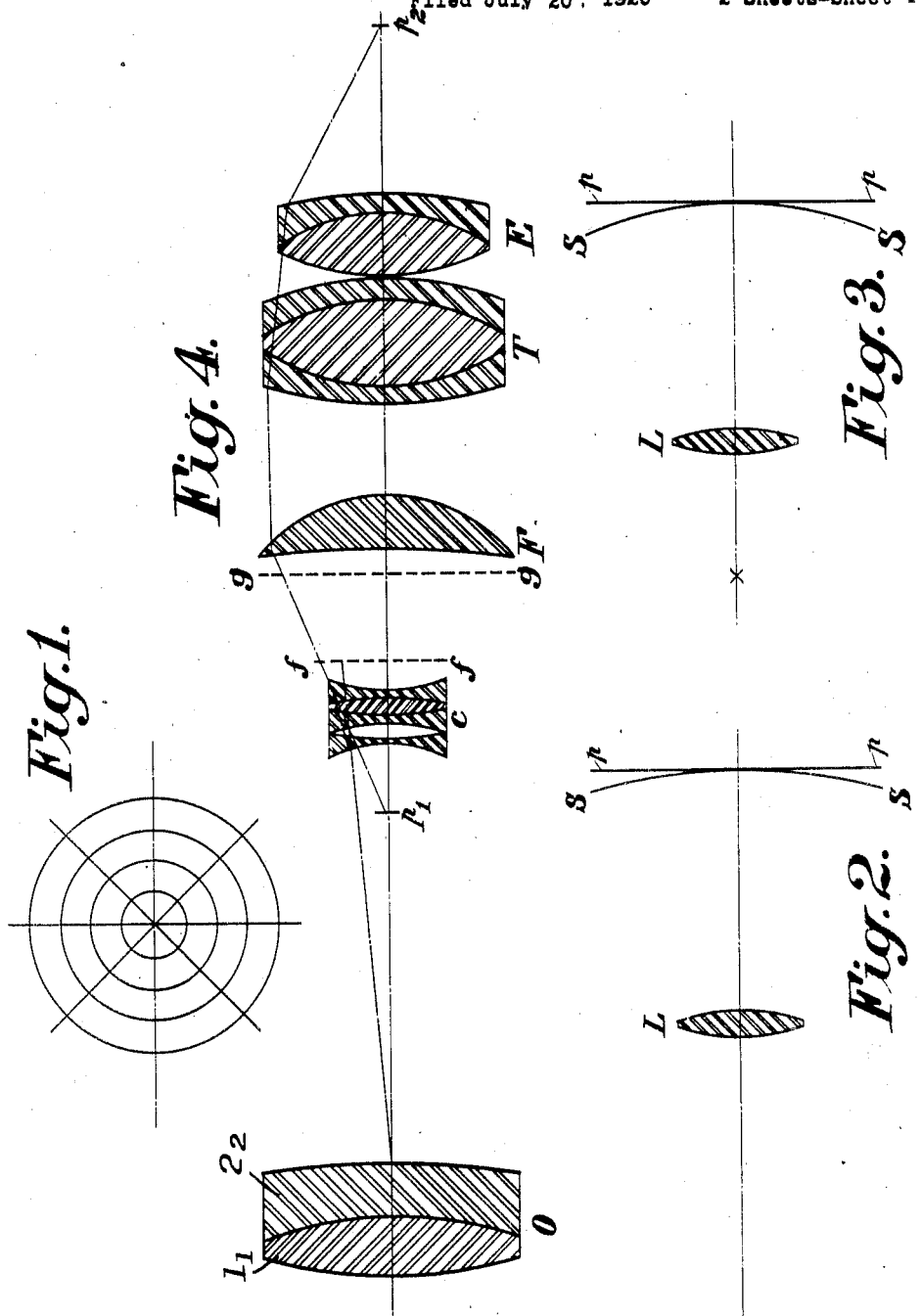

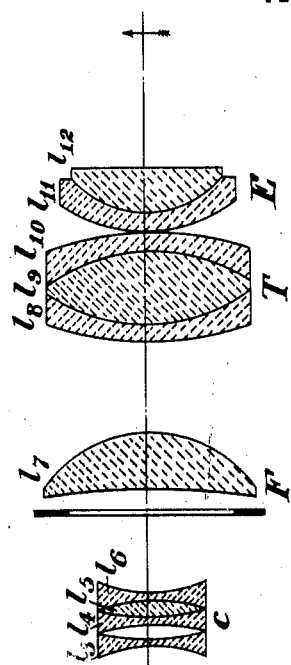
Fig. 5.
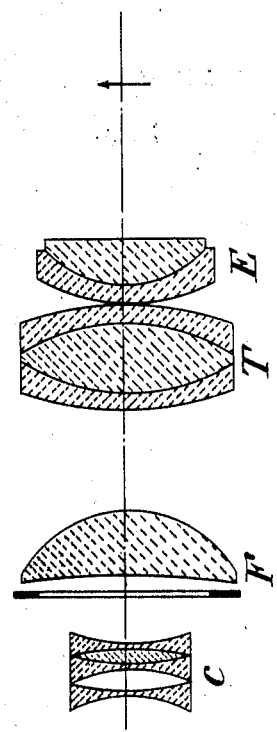
Fig. 6.
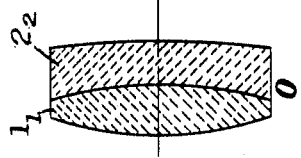
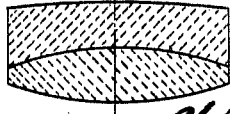
Inventors.
Alfred Taylor
and
Harold D. Taylor
by
Sturtevant & Mason Patented Sept. 25, 1923.

1,468,762

UNITED STATES PATENT OFFICE.

ALFRED TAYLOR AND HAROLD DENNIS TAYLOR, OF YORK, ENGLAND.

TELESCOPE, MICROSCOPE, AND THE LIKE.

Application filed July 20, 1920. Serial No. 397,711.

*To all whom it may concern:*

Be it known that we, ALFRED TAYLOR and HAROLD DENNIS TAYLOR, subjects of the King of Great Britain, residing in York, in the county of York and Kingdom of England, respectively, have invented certain new and useful Improvements in Telescopes, Microscopes, and the like, of which the following is a specification.

The present invention relates to improvements in optical telescopes, microscopes and the like instruments.

According to the present invention the following principle which has already been applied to photographic lenses by Harold Dennis Taylor, one of the present applicants, in British Patents Nos. 1991 of 1893, 22607 of 1893, and 15107 of 1895 is applied to telescopes, microscopes and the like.

This principle may be explained essentially under five heads thus: (1st) that the curvature errors of a negative lens of a certain power P or of any number of such lenses of the same collective power P are equal to but of opposite sign to the curvature errors of a positive lens of power P or any number of positive lenses of collective power P. By collective power we do not mean equivalent focal power, but the simple sum of all the nominal powers quite irrespective of separations, which latter essentially influence the equivalent focal length or power. (2nd). That the curvature errors of a positive lens or lenses of a certain power or collective power can be neutralized in both primary and secondary planes simultaneously by a negative lens or lenses of about equal power or collective power placed in the same system and thus a flat anastigmatic field can be secured. (3rd). Therefore the usual negative eccentricity corrections are no longer wanted in the same degree as in usual constructions and therefore their total sum, if they exist at all, must approximate to zero. (4th). Although the nominal powers of negative and positive lenses may be equal in a system, yet this condition does not necessarily imply that the system is deprived of all positive power, for it can be proved that by means of judicious separations between negative and positive lenses a very considerable balance of positive power remains over for practical use, as was shown in the various photographic lenses described in the above cited specifications. (5th). Strictly speaking the ratio of equality between the summed nominal powers of negative lenses on the one hand and positive lenses on the other, is subject to slight modification, according to the well known theorem of Petzval expressed by the equation.

$$\left(\frac{1}{An_1}+\frac{1}{Bn_2}+\frac{1}{Cn_3}\right)-\left(\frac{1}{an_1}+\frac{1}{bn_2}+\frac{1}{cn_3}\right)=\frac{1}{R}$$

in which A, B, and C, are the focal lengths of the several positive lenses and $n_1$, $n_2$, $n_3$, their respective refractive indexes while $a$, $b$, and $c$, are the focal lengths of the negative lenses and $n_1$, $n_2$, $n_3$, their respective refractive indexes while R, is the radius of curvature of the resultant image on the condition that the eccentricity corrections are such as to permit or bring about an anastigmatic image. Therefore when the left side of the equation $=0$, then $\frac{1}{R}=0$ and the anastigmatic image is flat. It also follows that the powers of the positive lenses can be somewhat higher than the power of negative lenses provided that the refractive indexes of the former exceed as much as possible the refractive indexes of the latter. That is as far as is practicable the positive lenses should be made of glasses of high refractive indices and the negative lenses of glasses of low refractive indices.

However, since the lowest and highest refractive indices likely to be employed in practice are respectively 1.476, and 1.72 or in the ratio 1 to 1¼ only it will be seen that the Petzval theorem becomes of quite secondary importance in gaining positive power as compared with the much greater influence towards that end exerted by judicious axial separation between positive and negative lenses. Hence we lay the greatest stress on the broad general principle involved in our invention that the sum of the nominal powers of all the negative lenses in one of our new telescopes shall be substantially equal to the sum of the nominal powers of all the positive lenses.

According to this invention the above general principle as involved in the old so called "Cooke" photographic lenses, under the patents cited above, is applied to the construction of telescopes, especially telescopes of small calibre such as those used for prismatic binoculars with the object of securing a large flat field of view that is also free from the very marked curvature of field and astigmatism which hitherto has marred the performance of such telescopes. The invention is also applicable in certain cases to microscopes.

The invention will be more particularly described with the reference to the drawings:—

Figure 1 is a diagrammatic form of field having concentric and radial lines.

Figures 2 and 3 are diagrammatic views showing the flat and curved fields in the image of Fig. 1.

Figure 4. is a diagrammatic view of a suitable form of telescope according to this invention.

Figure 5. is a diagrammatic view of a suitable form of telescope giving power 10.

Figure 6. is a diagrammatic view of a modification giving power 7.

It is a fact well known to opticians that in the case of all telescopes as hitherto constructed it is impossible to obtain a flat field of view that is at the same time free from astigmatism towards the edges of the field. As an illustration, a small telescope may be supposed to be directed towards a distant flat board placed square to the line of sight and having drawn on it a series of radial lines all intersecting at the centre and a series of concentric circles all struck about the same centre, as in Fig. 1 of the accompanying drawing. If the optical corrections of the telescope are of the usual degree such that the images of all the concentric circles appear distinctly focussed at once, then the images of the radial lines will get more and more ill defined and nebulous as the edge of the field of view is approached and the eyepiece will have to be pushed in nearer to the objective in order to focus the outer ends of such lines, in which case, of course, the images of the outer circles crossing the... will, in their turn have become blurred.

The field may be said to be flat for tangential lines, but is inevitably strongly curved for radial lines and this necessarily implies astigmatism in the oblique pencils of rays which are supposed to form images of points near the edge of the field.

Fig. 2 shows such an eyepiece lens L and $p, p$ the flat field in which image of concentric circles are formed. Thus $s$—$s$ is the curved field in which images of the radial lines are formed and the separation between the plane and the curve is the measure of the longitudinal astigmatism, or difference of focus between them. If $p, p$ is flat then it can be shown that generally the radius of curvature of $s, s$ is 2¼ times the nominal focal length of the lens. If the optical corrections are made such that at the crossing points of concentric circles and radial lines near the edge of the field, both radial lines and circles crossing then can be seen in sharp focus at the same time, as can be done, then the field of view can be shown to be strongly curved to a radius generally about 1½ times the nominal focal length of the lens system concerned. Thus with no astigmatism there is much curvature, so that the eyepiece has to be pushed further in in order to focus distinctly upon points in the outskirts of the field.

The reason why images of both radial lines and concentric circles cannot be flattened simultaneously lies in the incongruity between the relation between the curvature errors of lenses in primary and secondary planes and the contrary eccentricity corrections in primary and secondary planes by which the former have to be corrected.

The formulæ for curvature errors for any lens of nominal principal focal length F and refractive index $n$, and obliquity $\varphi$ is simply $$\frac{1}{2F}\left(\frac{3n+1}{n}\right)\tan^2\phi$$

in primary planes and $$\frac{1}{2F}\left(\frac{n+1}{n}\right)\tan^2\phi$$

in secondary planes and if $n$ be 1.5, these work out to $$\frac{1}{F}(1.83)\tan^2\phi \text{ and } \frac{1}{F}(.83)\tan^2\phi$$

and these are in the ratio of 11 to 5 or 2.2 to 1, whereas the eccentricity corrections, that are brought about by causing the oblique pencils of light to pass through the lenses eccentrically, are always in the ratio of 3 to 1 in primary and secondary planes, so that if the field is made flat in primary planes (for the concentric circles) it remains still curved in secondary planes (for the radial lines)

In Fig. 4, we give a rough sketch of one general arrangement for a telescope having a magnification of about 10 diameters. O is the achromatic objective —F is the principal focal plane of the same. $c$ is the negative corrector lens, which is preferably approximately achromatic and composed of at least three components, two negative components and one positive, the former of glass of low refractive index, and preferably the two negative components should be balsamed to the positive component, and on each side of it. The negative lens projects an enlarged image of $f$—$f$ onto the plane $g$—$g$, enlarged twice to 2¼ times. The principal rays radiating from the centre of the objective after passage through the negative lens seem to radiate from a point $p_1$. The chief function of the field lens F is to refract the principal rays radiating from $p$ into an approximately parallel or slightly converging beam so that they will find their way into the eyepiece lenses T+E and by these be refracted again through the pupil point, $p_2$ and into the observer's eye. The eye lens system T+E is preferably of the form described in our earlier patent specification 9565 of 1918 otherwise the power of the field lens F will have to be much increased. The field lens F should be of high refractive index and it slightly magnifies the image $g$—$g$ and presents this slightly magnified virtual image to the scrutiny of the eyepiece T+E. Focussing for varying distances of objects should be done by moving the objective and focussing to suit varying eye sight by moving T+E to and fro as one lens. For lower powers the negative lens should be made of larger relative diameter for the larger angular field that is involved and be placed nearer to the principal image so as to project a less enlarged image behind it also the focal length of the field lens F is decreased, while the focal length of T+E may be increased, or the focal length of the objective be decreased. But such changes usually render necessary a change in the curvatures of the negative correction, whose power must at the same time be kept approximately equal to the sum of the powers of the positive lenses, generally and in this case 95 to 97 per cent of the summed powers of the positive lenses.

At the same time, both in the case of the power 10 telescope and the power 7 telescope, shortly to be specified, it can be shown that the Petzval condition, as given by the equation under condition 5 is fulfilled with far greater completeness than we had first hoped for, owing to the elimination from the systems of eccentricity corrections of the 2nd, and higher orders. For if the latter exist, as they did exist in the case of the photographic lenses under the three earlier patents cited in our preamble, then the best practical compromise in optical performance is obtained when the sum $$\frac{1}{An_1}+\frac{1}{Bn_2}+\frac{1}{Cn_3} \&c.$$

for the positive lenses is rather greater than $$\frac{1}{an_1}+\frac{1}{bn_2}+\frac{1}{cn_3} \&c.$$

for the negative lenses, for instance 8 to 12% greater. Thus the optical performance of these two telescopes over apparent fields of 56 and 51 degrees respectively is of a higher order of perfection than was realized in the older photographic lenses based on the same general principle. As a matter of fact in the case of the power 10 telescope we have $$\Sigma\left(\frac{1}{an_1}+\frac{1}{bn_2} \&c.\right) = (1.016)\left(\Sigma\frac{1}{Anl}+\frac{1}{Bn_2}\right)$$

so that the anastigmatic field of view is actually negative or slightly curved concave to the observer's eye, which is in practice an advantage. In the case of the power 7 telescope we have $$\left(\Sigma\frac{1}{an_1}+\frac{1}{bn_2} \&c.\right) = (1.016)\left(\Sigma\frac{1}{An_1}+\frac{1}{Bn_2} \&c.\right)$$

and again the anastigmatic image is very slightly concave to the eye.

In the case of the power 10 telescope the nominal power of the negative corrector lens C is about 97 per cent of the sum of the nominal powers of all the other simple and compound positive lenses and in the case of the power 7 telescope the same relationship is 95½ per cent, and as we have shown, this departure from absolute equality is due to the fact that as a whole the refractive index prevailing in the negative corrector lens is substantially lower than that prevailing in the positive lenses. Thus a judicious selection of the glasses has enabled a closer approximation to be obtained to the ratio of equality between the nominal power of the negative corrector and the sum of the nominal powers of the positive lenses.

We will now specify the glasses, radii of curves, diameters (D), central thicknesses ($t$) and separations for a small telescope of 0.85 inches clear aperture and overall length over extreme lenses of 4.765 inches. Fig. 5 of the drawing of our complete specification is a sufficiently accurate section of our telescope on a larger scale. We will designate the lenses considered as main units, whether simple or compound, as O for the objective, C for the negative corrector lens, F for the field lens, T for the first (triple) eye lens, and E for the second (double) eye lens, while the individual lenses composing them are designated $l_1$ to $l_{12}$ and in the same order.

Power 10 telescope. (Fig. 5.)

Glasses.

O $\begin{cases} l_1 \text{ of light borosilicate crown } n_D \\ l_2 \text{ of extra dense flint } n_D \end{cases}$ = 1.5007 V = 65.5
= 1.6468 V = 33.9

C $\begin{cases} l_3, l_4 \text{ and } l_6 \text{ of fluor crown } n_D \\ l_5 \text{ of double extra dense flint glass } n_D \end{cases}$ = 1.4783 V = 71.3
= 1.7204 V = 29

F $\{ l_7 \text{ of dense barium crown } n_D$ = 1.611 V = 58.5

T $\begin{cases} l_8 \text{ and } l_{10} \text{ of double extra dense flint glass } n_D \\ l_9 \text{ of light barium crown } n_D \end{cases}$ = 1.7204 V = 29
= 1.5408 V = 59.5

E $\begin{cases} l_{11} \text{ of double extra dense flint glass } n_D \\ l_{12} \text{ of baryta light flint } n_D \end{cases}$ = 1.7204 V = 29
= 1.5508 V = 51.5

Radii of curves, &c., in inches.

O $\begin{cases} l_1 +1.52 \quad +1.4025 \quad t_1 = .195 \\ l_2 -1.4025 +5.86 \quad t_2 = .165 \end{cases}$ D = .88 to .89

Equivalent focal length = 2.992.

C $\begin{cases} l_3 - .485 - 1.0625 \quad t_3 = .023 \\ l_4 - .565 - 1.045 \quad t_4 = .023 \\ l_5 +1.045 + .816 \quad t_5 = .064 \\ l_6 - .816 - .663 \quad t_6 = .023 \end{cases}$ $D_2 = .425$ Clear aperture of adjacent surfaces of $l_3$ and $l_4$ inside chamfers = .402 in.

Clear apertures of external surfaces of $l_3$ and $l_6$ inside chamfers = .410 in.

$$F = l_7 - 2.60 + .51 \quad t_7 = .22 \quad D = .85$$

T $\begin{cases} l_8 +1.19 - .67 \quad t_8 = .068 \\ l_9 + .67 + .725 \quad t_9 = .290 \\ l_{10} - .725 +1.38 \quad t_{10} = .068 \end{cases}$ D = .81

$\begin{cases} l_{11} +.595 - .372 \quad t_{11} = .064 \quad D_{11} - .71 \\ l_{12} +.372 -4.58 \quad t_{12} = .179 \quad D_{12} = .60 \end{cases}$ Axial air space between O and C = 2.56.
Axial air space between C and F = .416.
Axial air space between F and T = .35 (for infinite sight).
Axial air space between T and E = not more than .005.

The sharp edge of the field stop for 55 degrees of apparent field should be .605 clear aperture and lie in a plane .145 in front of the first vertex of the field lens.

The clear distance behind the eye lens at which the Ramsden circle is formed is .43 in.

Power 7 telescope of .85 aperture (Fig. 6). This is composed of the same number of lenses as the last and has an overall length of 4.22 in. Its section is shown in Fig. 6 of our complete specification.

Glasses.

O $\begin{cases} l_1 \text{ of light borosil crown } n_D \\ l_2 \text{ of extra dense flint } n_D \end{cases}$ = 1.5007 V = 66.5
= 1.6509 V = 33.4

C $\begin{cases} l_3, l_4 \text{ and } l_6 \text{ of fluor crown } n_D \\ l_5 \text{ of double extra dense flint } n_D \end{cases}$ = 1.4783 V = 71.3
= 1.7204 V = 29

F $\{ l_7 \text{ of dense barium crown } n_D$ = 1.611 V = 58.5

T $\begin{cases} l_8 \text{ and } l_{10} \text{ of double extra dense flint } n_D = 1.7204 \text{ V} = 29 \\ l_9 \text{ of light barium crown } n_D \end{cases}$
= 1.5408 V = 59.5

E $\begin{cases} l_{11} \text{ of double extra dense flint } n_D \\ l_{12} \text{ of light barium crown } n_D \end{cases}$ = 1.7204 V = 29
= 1.5408 V = 59.5

*Radii of curves, &c., in inches.*

$$O \begin{cases} l_1 + 1.232 + 1.203 & t_1 = .212 \\ l_2 - 1.203 + 5.27 & t_2 = .170 \end{cases} D = .89 \text{ apart } .85$$

Equivalent focal length = 2.48.

$$C \begin{cases} l_3 - .421 - 1.275 & t_3 = .021 \\ l_4 - .565 - 1.045 & t_4 = .021 \\ l_5 + 1.045 + .816 & t_5 = .072 \\ l_6 - .816 - .664 & t_6 = .021 \end{cases} D_2 = .468$$

Clear apertures of adjacent surfaces of $l_3$ and $l_4$ inside chamfers = .446.

Clear apertures of external surfaces of $l_3$ and $l_6$ inside chamfers = .455.

$$F \{ l_7 - 4.675 + .489 \ t_7 = .265 \quad D_7 = .85$$

$$T \begin{cases} l_8 & 1.555 - .816 & t_8 = .063 \\ l_9 & .816 & .754 & t_9 = .283 \\ l_{10} - & .754 & 1.352 & t_{10} = .063 \end{cases} D_4 = .85$$

$$E \begin{cases} l_{11} + .669 - .421 & t_{11} = .063 \quad D_{11} = .74 \\ l_{12} + .421 - 10.625 & t_{12} = .184 \quad D_{12} = .645 \end{cases}$$

Axial air space between O and C = 2.07
Axial air space between C and F = .255
Axial air space between F and T = .39
Axial air space between T and E = not more than .005

The sharp edge of the field stop for 51° of apparent field should be .55" clear aperture and lie in a plane .153" in front of the first vertex of the field lens.

The Ramsden circle is formed at a clear distance of .60 in. behind the eye lens.

*Erecting of the image.*

The telescopes above specified give inverted images and means has to be provided for erecting them. It would be impracticable to employ the ordinary crossed pair of doubly reflecting right angled prisms between $L_1$ and $L_2$ as is usually done, owing to the great difficulty in adjusting the prisms perfectly enough to do justice to the beautifully corrected field of these telescopes. They would have to be capable of both lateral and angular adjustments of great nicety, the effects of which are so mixed up and puzzling that great skill and expense would be involved. Our method is to place erecting prisms of the sort described in our British patent specification No. 129089, in front of the objectives of our telescopes. These prisms only require a tilting adjustment in two planes, and their lateral displacements, if any, have no optical effect.

But the telescopes will require adjusting in themselves, before the prisms are fixed on, 1st., for the correct position of the image between the lenses C and F and 2nd, for the proper magnifications.

*1st adjustment.*—A small dot of ink is made upon the centre of the hollow surface of the field lens. The eyepiece lenses T and E, which are mounted together in a screwed tube for focussing to suit individual eyesight, should be screwed inwards towards the field lens while directing the telescope towards a light back-ground, until the spot of ink becomes just sharply focussed. The eyepiece, which is now focussed upon the hollow surface of the field lens should next be screwed .130 to .135 inch further in still, when the aperture of the field stop, if placed at its correct above specified distance from the field lens, will be seen in sharp focus. The eyepiece and field lens are now in correct relative positions for that particular observer trying the telescope on some infinitely distant test object or artificial star, but the objective and negative corrector will still require adjustment relative to the field lens, as follows:—

*2nd. adjustment.*—After the above 1st. adjustment the bringing of the image of a distant object into focus in the centre of the field must be effected by moving or screwing the objective to and fro. Then the Ramsden circle behind the eye lens must be measured by a dynamometer to ascertain the magnifying power. If the power is too high then the negative lens C must be screwed nearer to the field lens and the image be re-focussed and power tried again until got exactly 10 or 7 as the case may be. Should the power be too low than the negative lens C must be screwed further away from the field lens, and so on, an hundredth of an inch either way having a quite perceptible effect upon the magnification. The position of C must then be fixed relatively to F and thereafer all focussing upon near objects must be done by an outward movement of the objective, while the focussing for the observer's eye-sight must be done by screwing T and E in and out and its eyecap or barrel should be engraved with a scale of diopters for that purpose. Or if no such scale is provided, it is generally sufficient to screw T and E inward, until the black edge of the field just becomes quite sharply defined.

The focussing clearance of .13 to .135 in. is required 1st, in order to secure that the final real image is well separated from the hollow surface of the field lens so that dust on the latter is not seen, and 2d, to give images of straight lines free from distortion. If the focussing clearance be reduced to .10 in. then a just perceptible negative or barrel distortion will be produced and if the clearance be .16 then positive or pincushion distortion.

It will observed that we have departed from the eye-lens E shown in Fig. 4, by placing the positive component next the eye instead of the negative component, because we have found that it gives more perfect corrections up to the edge of the large field of view obtained.

In the case of applying the same principle to a microscope, it is desirable that the objective, while retaining the same nominal power, shall be enlarged in aperture by making it a double or triple combination, and then used at a distance from the object to be examined slightly longer than its equivalent focal length, so as to project an already enlarged image into the rest of the system C + F + T + E which will then constitute the eyepiece. Should the whole be too long then all the curves and other dimensions of the system may be all reduced in the same proportion.

Having now particularly described and ascertained the nature of our said invention and in what manner the same is to be performed, we declare that what we claim is:—

1. In a system of lenses adapted for use as telescopes, microscopes and the like, the combination of an objective, a field lens and two compound eye lenses with a compound negative corrector lens the nominal power of said corrector lens being substantially equal to the sum of the nominal powers of all the positive lenses in the same system.

2. In a system of lenses adapted for use as telescopes, microscopes and the like, the combination of an objective, a field lens, two compound eye lenses and a compound negative corrector lens, the ratio between the sum of the reciprocals of the product of the focal length and refractive index of the negative lenses and the sum of the reciprocals of the product of the focal length and refractive index of the positive lenses is of a value 1.016.

In witness whereof we have hereunto signed our names this 1st day of July, 1920, in the presence of two subscribing witnesses.

ALFRED TAYLOR.
HAROLD DENNIS TAYLOR.

Witnesses:
EDWARD B. CIPRIANI,
MARTHA W. BOTTOMLEY.